United States Patent [19]

Mirzaoff

[11] Patent Number: 5,604,607
[45] Date of Patent: Feb. 18, 1997

[54] LIGHT CONCENTRATOR SYSTEM

[75] Inventor: Alexander D. Mirzaoff, Webster, N.Y.

[73] Assignee: Eastman Kodak Company, Rochester, N.Y.

[21] Appl. No.: 963,292

[22] Filed: Oct. 19, 1992

[51] Int. Cl.$^6$ ............................................. G03B 27/00
[52] U.S. Cl. ................. 358/484; 250/208.1; 250/227.2; 250/227.11
[58] Field of Search ................. 358/484; 250/208.1, 250/227.2, 227.11; 355/1

[56] References Cited

U.S. PATENT DOCUMENTS

| | | | |
|---|---|---|---|
| 3,923,381 | 12/1975 | Winston | 350/293 |
| 3,957,031 | 5/1976 | Winston | 126/270 |
| 4,003,638 | 1/1977 | Winston | 350/293 |
| 4,088,121 | 5/1978 | Lapeyre | 126/271 |
| 4,240,692 | 12/1980 | Winston | 350/96.1 |
| 4,275,950 | 6/1981 | Meyer | 350/96.1 |
| 4,357,704 | 11/1982 | Koechner | 372/72 |
| 4,382,656 | 5/1983 | Gilby | 350/96.28 |
| 4,441,783 | 4/1984 | Houghton et al. | 350/96.1 |
| 4,481,414 | 11/1984 | Gasper | 250/226 |
| 4,483,007 | 11/1984 | Winston | 372/72 |
| 4,541,414 | 9/1985 | Mori | 126/438 |
| 4,569,571 | 2/1986 | Reidinger | 350/96.24 |
| 4,586,076 | 4/1986 | Watt | 358/75 |
| 4,697,867 | 10/1987 | Blanc et al. | 350/96.1 |
| 4,728,981 | 3/1988 | Koek et al. | 355/1 |
| 4,742,225 | 5/1988 | Chan | 250/327.2 |
| 4,813,765 | 3/1989 | Negishi | 350/286 |
| 4,912,614 | 3/1990 | Goldenberg | 362/347 |
| 4,922,107 | 5/1990 | Rabl et al. | 250/504 R |
| 4,964,713 | 10/1990 | Goetzberger | 350/629 |
| 4,975,729 | 4/1990 | Gordon | 355/1 |
| 5,046,159 | 3/1991 | Hamanaka | 355/1 |
| 5,136,150 | 4/1992 | Fukushima | 250/208 |

OTHER PUBLICATIONS

"Axially Symmetric nonimaging Flux Concentrators With the Maximum Theoretical Concentration Ratio", by Joseph O'Gallagher et al., from J. Opt. Soc. Am. A/vol. 4, No. 1/Jan. 1987; pp. 66–68.

"Dielectric Compound Parabolic Concentrators" by Roland Winston, from Feb. 1976/vol. 15, No. 2/Applied Optics; pp. 291–292.

"Approaching the Irradiance of the Sun Through Nonimaging Optics" by Philip Gleckman et al., from Optics News, May 1989; pp.33–36.

Fiber Optics Principles And Applications by N. S. Kapany, pp. 128–131; 218–221; 238–239; 240–241.

*Primary Examiner*—Bernard Roskoski
*Attorney, Agent, or Firm*—Svetlana Z. Short

[57] ABSTRACT

A collector array for imaging comprises of a plurality of small concentrators having a hyperbolic cross section and a circular input and output aperture. Such an array is particularly suitable for use in conjunction with photoelectronic array-type detectors such as CCD's and with photographic film.

22 Claims, 6 Drawing Sheets

LIGHT CONCENTRATOR SYSTEM

BACKGROUND OF THE INVENTION

1. Field of the Invention

This invention relates to non-imaging light concentrators, and more particularly to concentrator arrays used in conjunction with light-sensitive mediums such as photoelectronic detector arrays or film for imaging.

2. Description Relative to Prior Art

Presently, most known optical systems use lens elements that image light from a source directly onto a light-sensitive medium such as a film or a CCD array. Other known systems, such as one described in U.S. Pat. No. 4,975,729, employ a fiber optic bundle to channel light from a source, such as an LED array, onto a CCD array.

Figure 1:
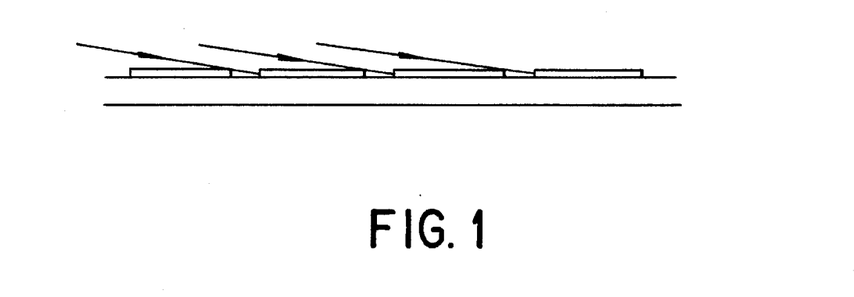
FIG. 1 is an enlarged schematic elevational view of a portion of a CCD array and illustrating highly angular light rays impinging on pixel recording elements thereof.

Many optical systems do not attain the optimum possible signal-to-noise ratio either because they do not collect the maximum amount of light from the light source, or because the light leaks from one pixel to another. As will be described in further detail below, photoelectronic detector arrays such as charge-coupled devices (CCD's) are typically made with an intercell barrier between the adjacent cells (or pixel recording elements). FIG. 1 shows that this barrier can be compromised by highly angular light (relative to the array normal) impinging on cell walls thereby providing inaccurate recording.

SUMMARY OF THE INVENTION

An object of this invention is to obtain an increase of irradiance on a small area, such as pixel elements on a detector array and thus an increase in signal to noise ratio in an optical system. Still further objects and advantages are realized and will become apparent after a reading of the detailed description of the embodiments of the invention.

According to the present invention, an image capture system of exceptional efficiency is provided for the collection and concentration of electromagnetic energy. In accordance with the invention, there is provided a photosensitive medium for capturing an image and a planar array located proximate to the photosensitive medium for guiding into the medium light modulated with image information. The array includes a plurality of concentrator elements (cells) formed in the array. The concentrator elements each have an input and output opening and reflective inner wall between each input and output openings. The reflective inner walls function to guide and concentrate radiant energy or light impinging upon an input opening toward and through a output (exit) opening toward the photosensitive medium. According to one aspect of the invention, the photosensitive medium is film. According to another aspect of the invention, the photosensitive medium is a detector array. It is contemplated that the detector array will have a plurality of pixel elements for detection of the above-mentioned radiant energy. In a preferred embodiment of the structure of the present invention a detector array and a collector (i.e. a concentrator array) are located in close proximity with one another and are aligned in such a way, that the centers of the above-mentioned exit opening of concentrator elements will correspond closely to the centers of the above-mentioned pixel elements.

DETAILED DESCRIPTIONS OF THE PREFERRED EMBODIMENTS

Figure 2:
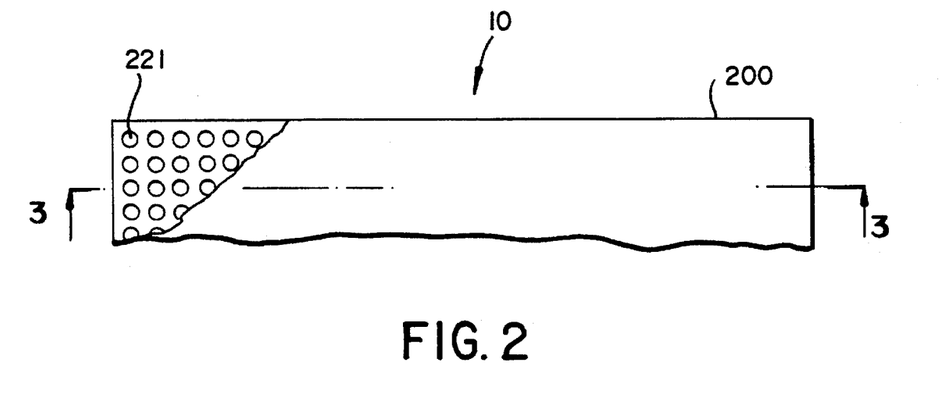
FIG. 2 schematically illustrates, greatly magnified, a planar view of a concentrator array of the invention.
Figure 3:
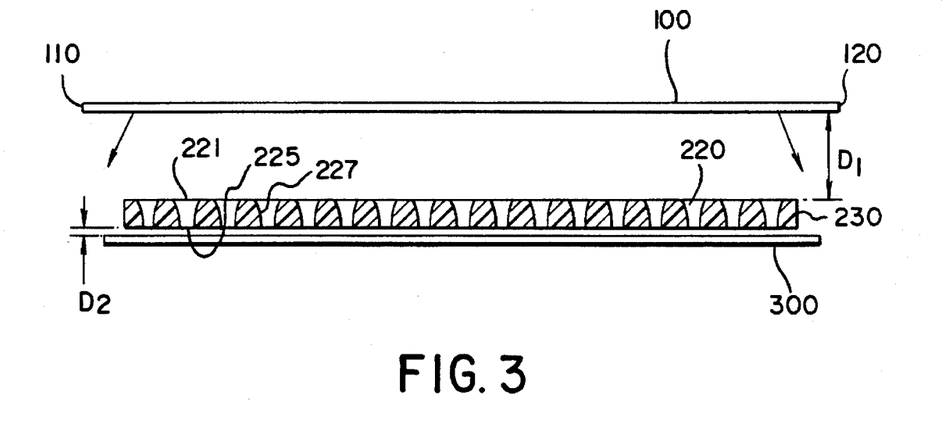
FIG. 3 illustrates an elevation section taken along line 3—3 of the concentrator array shown in FIG. 2 and includes a schematic of a light source and a detector array.

Referring to FIGS. 2 and 3, them is shown a schematic of an electromagnetic energy concentration and collection device 10 of one embodiment of this invention. (The details not shown are selectable from those known in the prior art.) The collection device 10 includes a collector or a concentrator array 200 and a detector array 300. The function of a concentrator array (i.e. collector) 200 is to concentrate light coming from an image bearing source or object 100. This light impinges on the collector 200 and gets funneled through a plurality of concentrator elements and out of the collector array onto the surface of the detector array 300. The array 300 is typically an area array sensor such as a CCD (charge coupled device). The source or object is typically of one- or two-dimensional form and of finite dimensions defined in one dimension by edges 110 and 120 and is of finite distance $D_1$ from the concentrator array 200.

Figure 4:
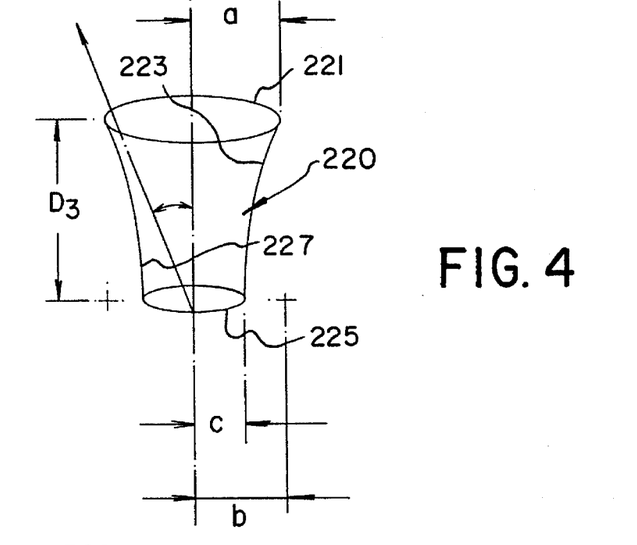
FIG. 4 schematically illustrates in perspective a construction of an individual element of the concentrator array of FIG. 2.

This collector 200 includes a plurality of reflective, positively curved (with respect to the incident light), non-imaging concentrator elements 220 illustrated in FIG. 3. The concentrator elements are specially shaped pathways or conduits formed in the opaque material 230. An individual concentrator element 220 is illustrated in FIG. 4. Each concentrator element has an input opening 221 and an output opening (i.e. an exit opening) 225. These openings are typically circular in shape, although other shape openings can also be used. There is a reflective inner wall 227 between each input and output opening. The concentrator elements have hyperbolic inner walls and are typically hollow inside (i.e. have air as medium). However, it is contemplated that they may also include a light transparent medium other than air. The purpose of these elements is to gather as much light as possible by the sight angle of acceptance θ (see FIG. 7) of its input opening and then guide the ray bundle to an output opening as a concentrated beam of uniform radiance.

Figure 5:
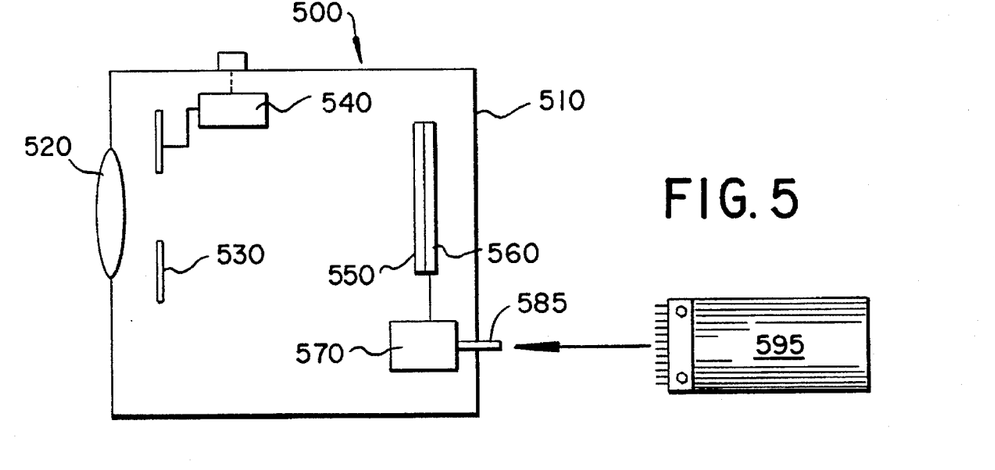
FIG. 5 is an elevational view in schematic of a camera that incorporates a concentrator array and a CCD array in accordance with the invention.

The concentrator element 220 is also referred to as a flow line concentrator (FLC). FIG. 5 is a schematic view of a camera 500 constructed in accordance with one embodiment of applicant's invention. The camera comprises a camera body 510, a lens 520 for imaging an object, a shutter 530, an exposure control and shutter release means 540, a concentrator array 550, a light sensitive medium 560 such as a CCD array, processing electronics and memory means 570, a socket or pin(s) 585 allowing electrical coupling to memory means 595.

The concentrator array 550 is located in close proximity with the detector array 560. When the lens 520 images an object, the imaging light goes through a concentrator array which channels the imaging light or radiation directly onto the individual pixels of the array 500, thus increasing the signal to noise ratio of the overall system.

The typical concentrator element (as illustrated in FIG. 4) when used in an array in conjunction with a multiple element area array detector such as a CCD detector having pixel sizes in the range of 8 to 15 micrometers will have an input opening diameter 2$a$ in the range of approximately 15 to 50 micrometers and an output (i.e. exit) opening diameter in the range of 3 to 15 micrometers. The concentrator detector array will have a height $D_3$ of 5 to 30 micrometers. Larger detectors (such as an IR radiation detector used in other applications) may require larger size concentrator elements. These larger size concentrator elements may be several millimeters in diameter. Generally, the diameters of the concentrator elements will be less than 1 cm in diameter. The concentrator element 220 shown in FIG. 4 is completely defined by the following performance variables:

| | |
|---|---|
| input opening radius | a |
| length of FLC | $D_3$ |
| curvature of guide tube | h(x,y) |
| exit or output opening radius | c |
| hyperbolic radius | b |
| Such a concentrator element will have a concentration ratio | $(b/c)^2$ |

Performance variables for an array of these concentrator elements would be determined in part by the system in which they were employed. For a linear light source 100, such as a fluorescent aperture tube source serving as a source of diffuse light, the variables would include:

dimension of fluorescent aperture distance between the array and the source geometric configuration of the array array density of the array (relative to incident flux density and intensity)

distance between the array and the target (i.e., the detector array)

asymptotic angle to the hyperbolic function of the FLC

The FLC equation is derived from the general hyperbolic equation. To determine the ideal form for an FLC in a particular application one needs only to determine the desired solid angle from the source to the target, translate that to a two dimensional angle and then apply that as the asymptotic angle to a hyperbola (FIG. 4).

Figure 6:
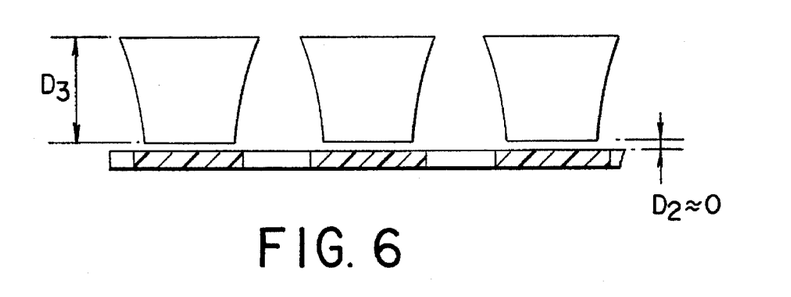
FIG. 6 is a schematic of a row of concentrator elements located in close proximity to a detector array.
Figure 7:
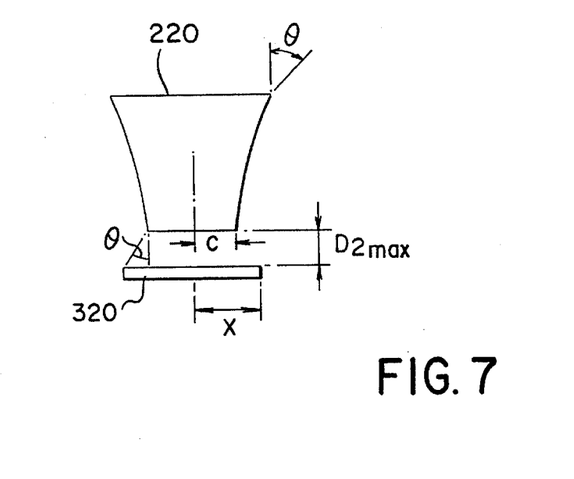
FIG. 7 illustrates the relationship between the position of the individual concentrator element of FIG. 6 and a pixel recording portion of a detector array.

In order to maximize the efficiency of the concentrator array, the user may wish to minimize the distance $D_2$ between the concentrator array and the detector array (FIG. 6) so that $D_2 \approx 0$. The maximum distance $D_{2max}$ (as shown in FIG. 7) between the concentrator array and the detector array is $$D_2 \max = \frac{X-c}{\tan \theta}$$

where θ=is light input angle, c is the exit opening radius and 2X is the width of the pixel element (320). In this case, all of the energy from each concentrator element 220 can be channeled into a corresponding pixel element 320. This will improve S/N ratio of the detector array and the overall optical system by isolating power input to each element and concentrating said input in the center of the sensitive element (pixel) of the detector array.

The advantage of the collector lies in the fact that it will gather and uniformly concentrate light at its output from a wide acceptance angle. The radiance will be continuous with respect to input radiance up to the asymptotic angle (defined above). Furthermore, if the concentrator elements are hollow, the transmission, relative to wavelength, will be almost 100% over this range (dependent only on the spectral absorption characteristic of the FLC walls). There is no optical material transmission loss. This makes these devices ideal for broadband spectral applications or maximum photon efficiency.

Figure 8:
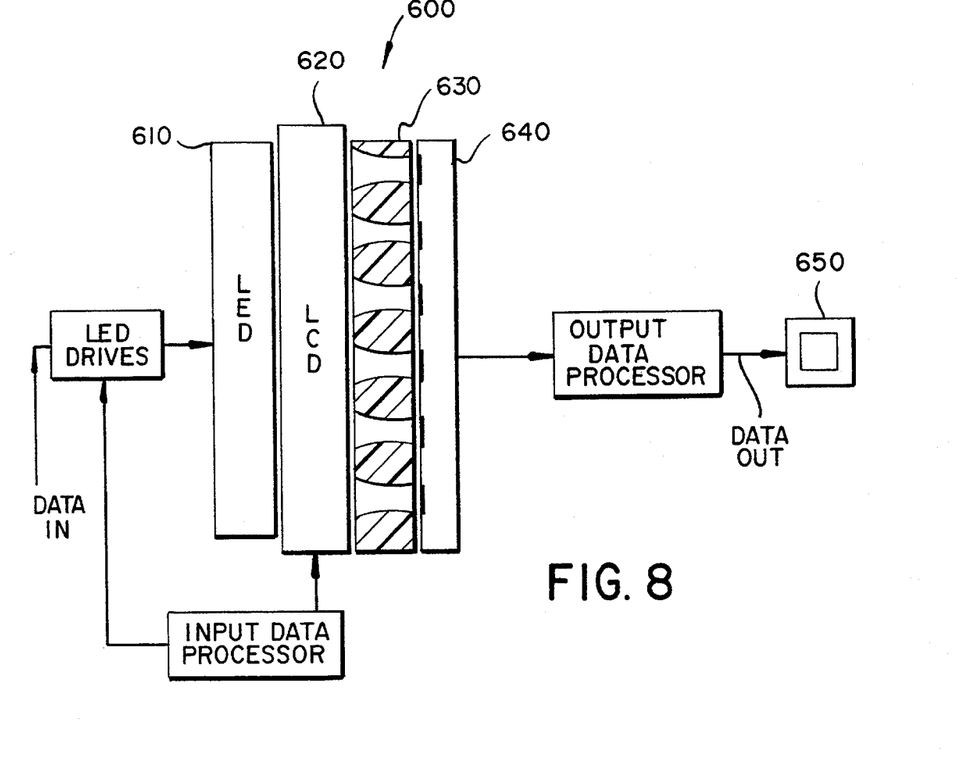
FIG. 8 is a schematic of an optical computer that incorporates a detector array and a CCD array in accordance with the invention.

In the second illustrative embodiment of the present invention the collector is used in an electro-optical computer 600 illustrated in FIG. 8. The computer 600 is comprised of a four layer sandwich made of two-dimensional matrix of LEDs 610, a 2-dimensional LCD array 620, a 2-dimensional concentrator array 630 and an area array detector such as a CCD array 640. The LED array 610 functions as a light source means providing an input function represented by the arrangement or pattern of LED that are driven on by suitable LED drivers that are responsive to input data to be modified in accordance with a predetermined algorithm. The LCD array 620 selectively attenuates or modulates the incoming light from the LED matrix source 610 according to a specific function that is being requested of the computer. The concentrator array 630 then channels the incoming light or radiation to specific pixels on the CCD array 640. The concentrator array is arranged in such fashion that there is a 1 to 1 correspondence between individual concentrator elements and individual pixel elements on a CCD array and so that the centers of each individual pixel element and each individual concentrator element are in substantial alignment with each other. This will improve S/N ratio of the system by isolating and concentrating power input onto specific pixel elements of the CCD array. In addition, there is a one-to-one correspondence between each LED and each pixel element in this example. The output of the LED's as modulated by the LCD modulator and recorded by the CCD's is output from the CCD's and the signal is processed and displayed on display which represents the output of the processed input data by the computer.

Figure 9:
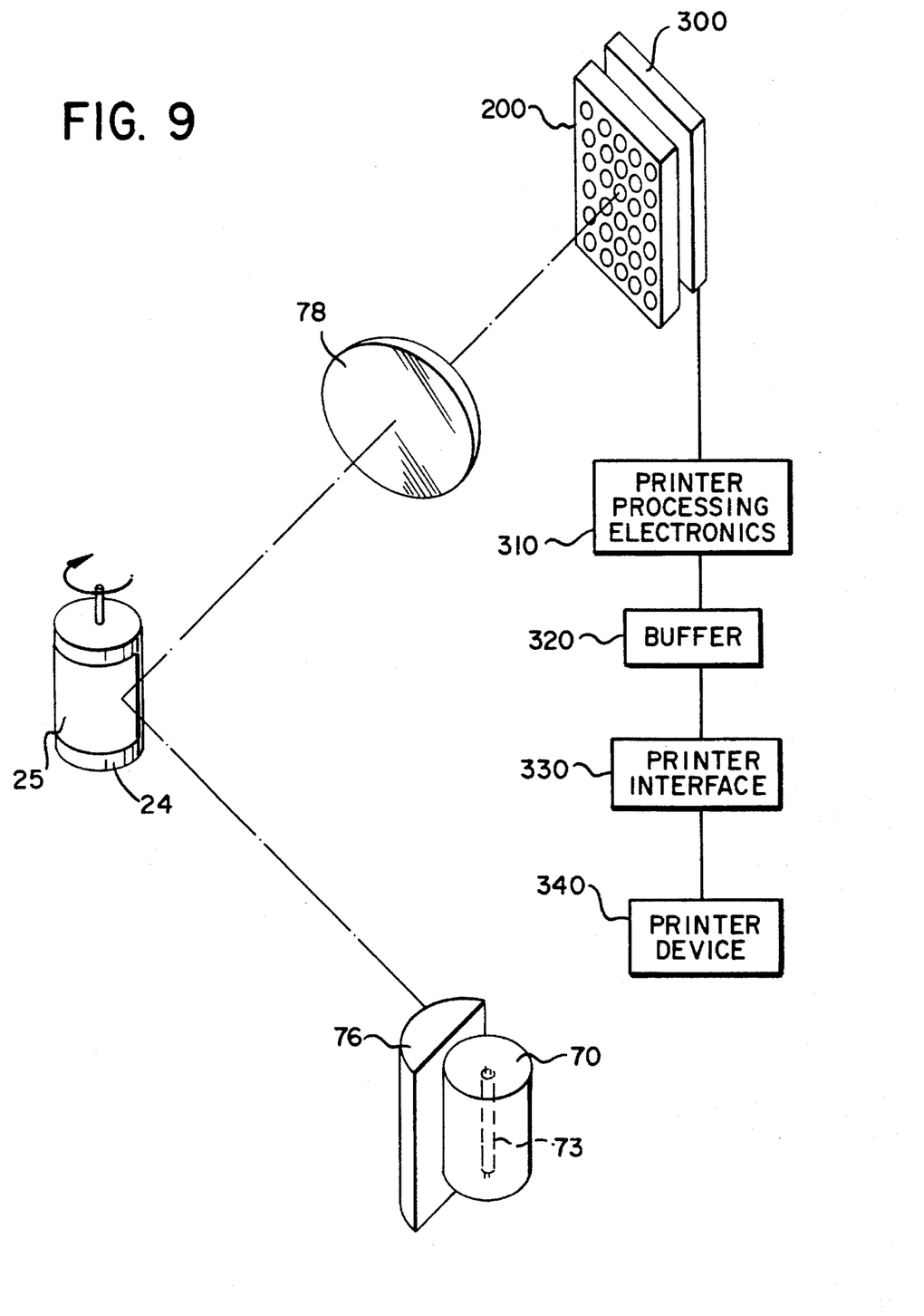
FIG. 9 shows a schematic representation of an optical system that utilizes the invention illustrated in FIG. 1 for the use in an electronic printer.

FIG. 9 shows a schematic representation of the third illustrative embodiment of the present invention. This is an electronic printer system similar to the one shown in U.S. Pat. No. 4,975,789. Lamp 70 is shown as having linear filament 73. Light from a linear source, i.e. lamp 70, is transmitted by the condensor lens 76 to scan the document 25 located on a rotating drum 24. The light then reflects from the document 25 (i.e, the object to be imaged) onto a projection lens 78 which transmits it to a concentrator array 200. The concentrator array then channels the light on to the CCD detector 300. The printer system also includes printer processing electronics 310, a buffer 320, a printer interface 330 and a printer device 340 for reproducing the information on the original document. Again, as the scanning function is formed, the light from the object is being channeled into the concentrator array 200 and then onto the detector 300.

Figure 10:
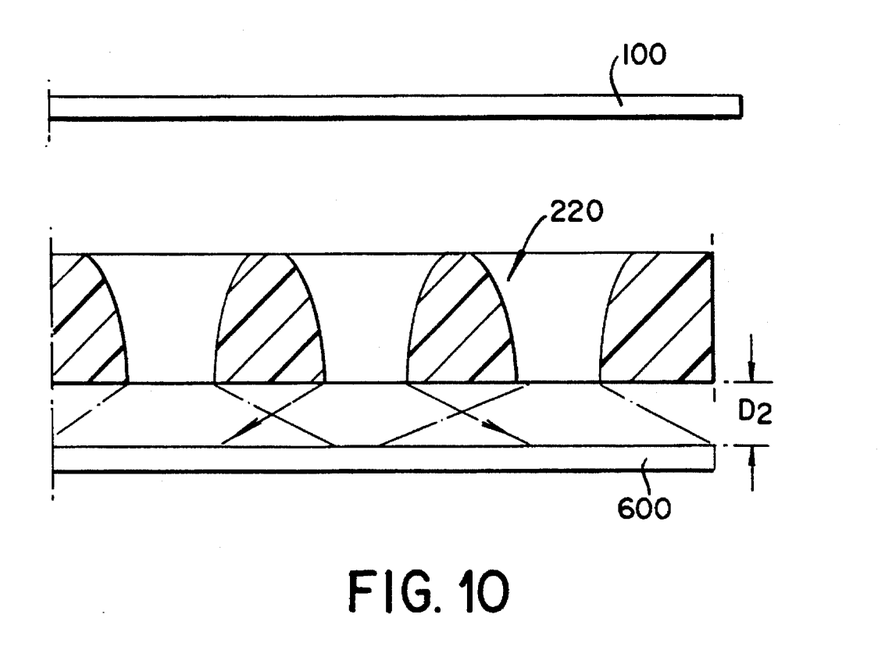
FIG. 10 shows the location of the concentrator array of the invention relative to a photosensitive film.

The fourth illustrative embodiment of the present invention is the film exposure apparatus (FIG. 10) the object of which is to uniformly expose a section of the film roll for testing purposes. In this embodiment, the collector array is used to provide a uniform illumination in the image plane where a light-sensitive medium (i.e. film 600) is located. Note that the distance $D_2$ between the collector array and the light-sensitive medium is relatively large (FIG. 10), so that the light from source 100 and collected from each of the concentrator elements $220_i$ is overlapped by light collected from at least one adjacent concentrator element.

Figure 11:
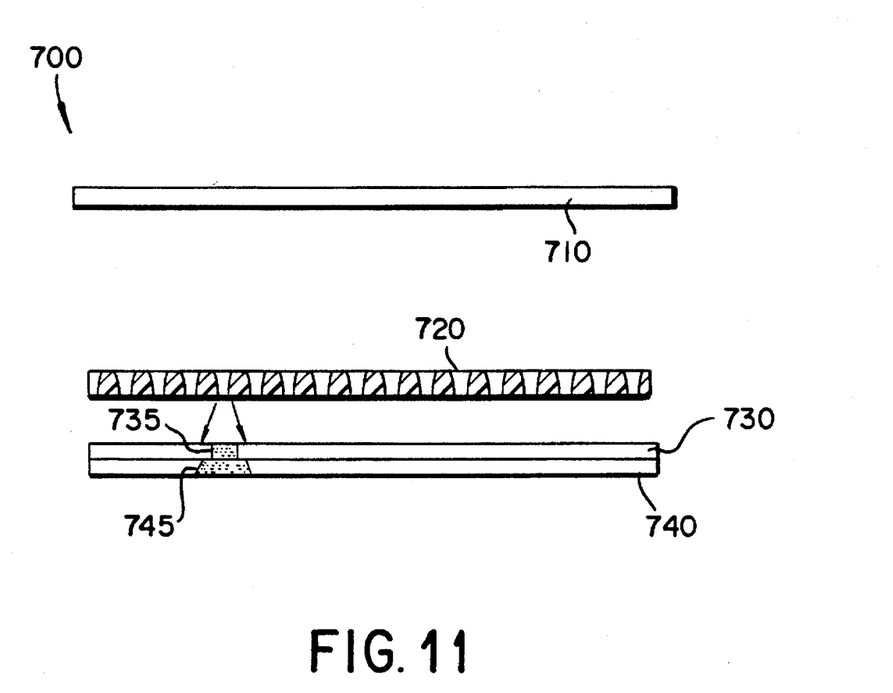
FIG. 11 shows a schematic representation of a contact printer that incorporates a concentrator array of the invention and a photosensitive film.

The fifth illustrative embodiment of the present invention is the contact printer system 700 shown in FIG. 11. The optical system of this embodiment includes a diffuse light source 710, a concentrator array 720, a film original 730 having an image 735 to be copied onto a copy film 740. Latent image 745 is shown recorded on copy film 740 and this latent image is the image formed of the image 735 to be copied. Since the output angle of the light which is leaving the concentrator array 720 is the same as the input angle of the light going into the array element, the spacing between the concentrator array 720 and the film original provides for the spread of the light as it leaves the concentrator array. This results in the fusing or softening of the image 745 on the copy film 740. Such softening may be useful in an application like a portrait photography.

Figure 12A:
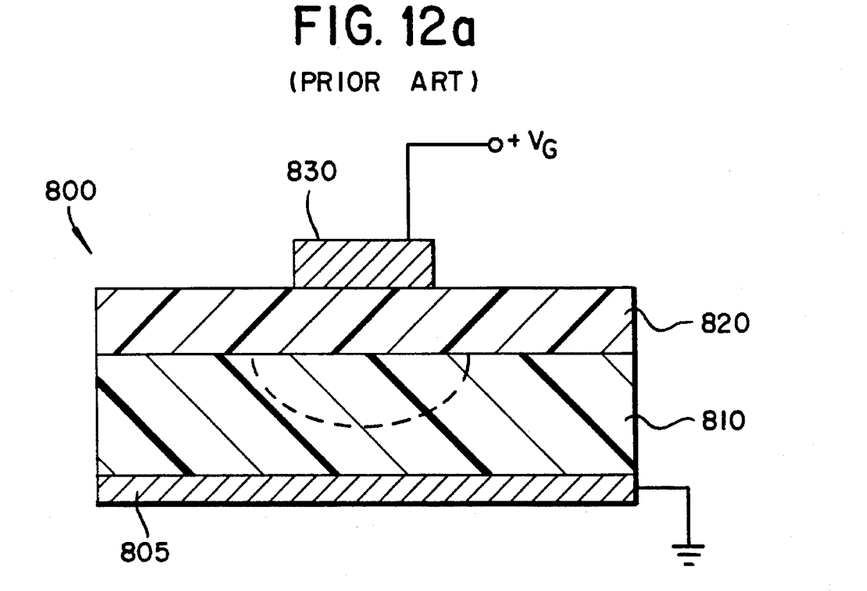
FIG. 12a shows a schematic representation of a CCD cell architecture of the prior art.
Figure 12B:
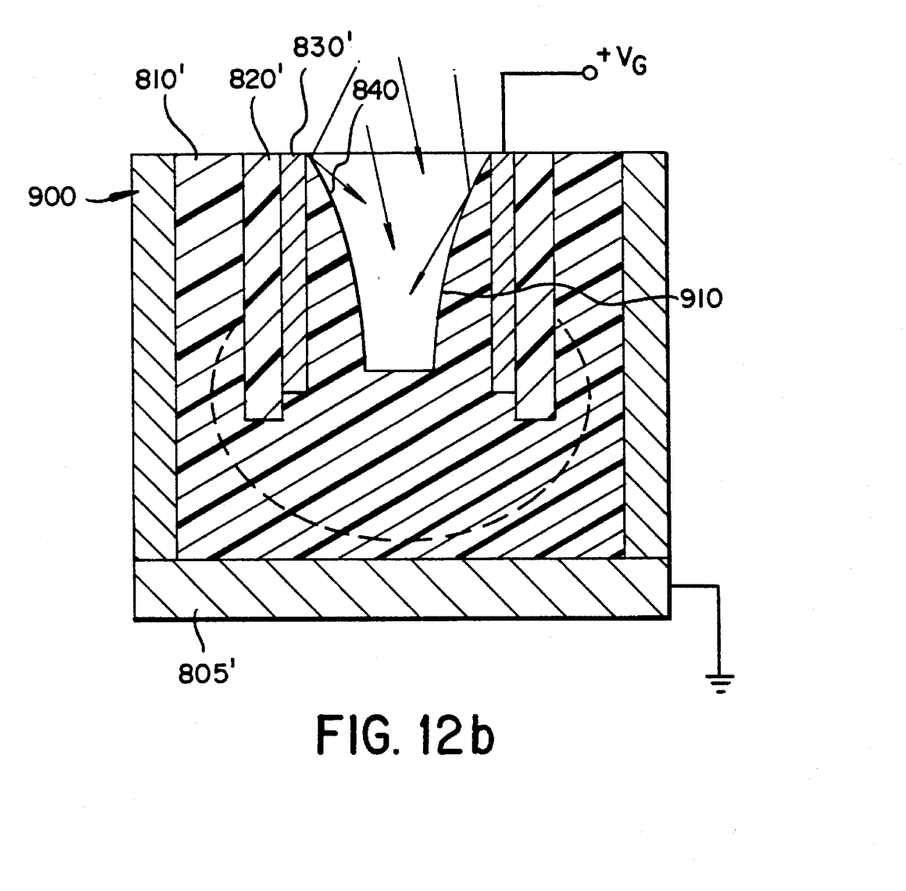
FIG. 12b shows a schematic representation of a modified CCD cell architecture including an embedded collector element in accordance with the invention.

The sixth illustrative embodiment of the present invention is a modified array sensor, such as a CCD array illustrated in FIG. 12b. FIG. 12a shows a conventional CCD array in schematic form. The convention CCD cell comprises a metal electrode 830, an insulator material 820, a semiconductor layer 810, and a ground connector 805.

In contrast to a typical pixel 800 illustrated in FIG. 12a and employing layers of different materials, a modified area array illustrated in FIG. 12b employs a different pixel construction. Each of the new pixels 900 have an individual concentrator element 910 embedded into it. The light is then concentrated onto the center of each pixel, thus reducing the cross-talk and enhancing S/N (signal-to-noise) ratio of the array. Of course, the modified pixels still comprise the layers of different materials (830' to 805', corresponding to layers 830 to 805 of FIG. 12a), but these layers are arranged differently within the pixel.

Finally, these concentrator elements and the arrays may be made in a variety of ways including: molding, machining, laser drilling, and blowing. In molding, a positive is machined or otherwise formed with the required dimensions and the final negative mold is cast around it. This method would be desirable for accurate dimensions and multiple copies of a larger concentrator. The same would be true for machining in terms of accurate dimensions (e.g. diamond turned metal blanks). Laser drilling, especially in plastics, can produce inexpensive, relatively uniform concentrator arrays of much smaller dimensions by controlling the laser wavelength, focal point, and beam profile relative to the material composition and thickness. For example, in laser drilling, the point of beam focus in a profile of PMMA (acrylic) along with beam diameter, will determine curvature and input opening and exit opening diameter of the FLC thus formed. Other parameters such as beam power, exposure, and auto-rotation of the beam could control concentrator diameter and wall polishing.

Glass blown concentrator elements may prove cost effective in large, uniform quantities. In this method, a glass tube of desired length and wall thickness is heated and subjected to gas pressure at one end. The pressure, combined with the softened glass, will form the desired input aperture shape at the tube end. These methods can be used to approach the theoretical dimensions of a FLC. In the array form, slight errors would be lost in the average.

The array configuration of concentrator elements as non-imaging elements in an optical train could be applied to a number of systems to increase efficiency. One primary possibility is the use in front of multi-element, solid state, photosensitive devices (e.g., CCD array). An example of such use is illustrated in some of the above embodiments. This would have the effect of increasing the photonic efficiency of these devices particularly when coupled with the proper lens system by isolating power input to each element and concentrating said input in the center of the sensitive element. The emphasis here is on the hyperbolic FLC though a compound parabolic concentrator may be more applicable under some conditions.

The invention has been described in detail with particular reference to preferred embodiments thereof, but it will be understood that variations and modifications can be effected within the spirit and scope of the invention.

I claim:

1. An image capture system comprising:

a photosensitive medium for capturing an image;

a single path planar array located proximate to said medium for projecting light modulated with image information to the photosensitive medium, said array including a plurality of non-cylindrical concentrator elements formed in said array, said concentrator elements each having an input opening and an output opening and a reflective inner wall between each input opening and output opening which guides and concentrates said light towards and through an output opening towards said photosensitive medium for capturing said image, wherein for each of said elements, said input opening is larger than said output opening.

2. An image capture system according to claim 1 in which said photosensitive medium is film.

3. An image capture system according to claim 1 in which said photosensitive medium is a photoelectronic detector array.

4. An image capture system according to claim 3 in which the size of said output openings, the width of said pixel elements and the distance D between said array of concentrators and said detector array satisfy the relationship $$D \leq \frac{X - c}{\tan \theta}$$

where $\theta$ is the light input angle, c is the output opening radius and 2X is the width of said pixel element.

5. An image capture system according to claim 2 in which said concentrator elements have hyperbolic reflective inner walls and circular input and output openings.

6. An image capture system according to claim 3 in which said concentrator elements have hyperbolic reflective inner walls and circular input and output openings.

7. An image capture system according to claim 3, said image capture system being a camera, said camera further comprising:

means for imaging an object onto said photosensitive medium;

means for controlling an exposure onto said photosensitive medium, and means for storing electrical signals representing said image;

a shutter;

an exposure control and shutter release means;

processing electronics; and memory means for storing said image.

8. An image capture system according to claim 7, wherein said photosensitive medium is a CCD array having a plurality of pixel elements.

9. An image capture system according to claim 8, said concentrator elements being aligned in close proximity to said detector array, in such a way that the respective centers of said output openings of said concentrator elements correspond substantially to respective centers of said pixel elements.

10. An image capture system according to claim 8 in which the size of said output openings, the width of said pixel elements and the distance D between said array of concentrators and said detector array satisfy the relationship $$D \leq \frac{X-c}{\tan \theta}$$

where $\theta$ is the light input angle, c is the output opening radius and 2X is the width of said pixel element.

11. An image capture system according to claim 9 in which said concentrator elements have hyperbolic reflective inner walls and circular input and output openings.

12. An image capture system according to claim 3, said image capture system being a printing system further comprising:

means for modulating light with an image on a document to be copied; and means responsive to light imaged on said detector array for forming a hardcopy of said image.

13. An image capture system according to claim 12, wherein said photosensitive medium is a CCD array having a plurality of pixel elements.

14. An image capture system according to claim 13, said concentrator elements being aligned in close proximity to said detector array, in such a way that the respective centers of said output openings of said concentrator elements correspond substantially to respective centers of said pixel elements.

15. An image capture system according to claim 14, in which said concentrator elements have hyperbolic reflective inner walls and circular input and output openings.

16. An image capture system according to claim 2, said image capture system being a contact printer system further comprising:

a light source; and a film original located so as to modulate light from said light source.

17. An image capture system according to claim 16, whereby the distance between said array of concentrators and said film original is such as to create an image blurring or softening on said copy film.

18. An image capture system comprising a photosensitive medium for capturing an image comprising discrete cells arranged in an array; and a plurality of concentrator elements for projecting light modulated with image information to said photosensitive medium, said concentrator elements each having an input opening and an output opening and a reflective inner wall between each input and output opening which guides and concentrates said light towards and through an output opening towards said photosensitive medium for capturing said image, wherein in each of said concentrator elements said input opening is larger than said output opening.

19. An image capture system according to claim 18 wherein said concentrator elements correspond one-to-one with said discrete cells arranged in said array.

20. An image capture system according to claim 18, said image capture system being a modified CCD array wherein said concentrator elements are embedded in said discrete cells of said array.

21. An image capture system comprising:

a photosensitive medium for capturing an image;

a single path planar array located proximate to said medium for projecting light modulated with image information to the photosensitive medium, said array including a plurality of non-cylindrical concentrator elements formed in said array, said concentrator elements each having an input opening and an output opening and a reflective inner wall between each input opening and output opening which guides and concentrates said light towards and through an output opening and towards said photosensitive medium for capturing said image, wherein for each of said elements, said input opening is larger than said output opening and where said input opening has a diameter $2a$ and said output opening has a diameter $2b$, where $15 \text{um} < 2a < 50 \text{um}$; and $3 \text{um} < 2b < 15 \text{um}$.

22. An image capture system comprising a photosensitive medium for capturing an image comprising discrete cells arranged in an array; and a plurality of concentrator elements for projecting light modulated with image information to said photosensitive medium, said concentrator elements each having an input opening and an output opening and a reflective inner wall between each input and output opening which guides and concentrates said light towards and through an output opening towards said photosensitive medium for capturing said image and where said input opening has a diameter $2a$ and said output opening has a diameter $2b$, where $15 \text{um} < 2a < 50 \text{um}$; and $3 \text{um} < 2b < 15 \text{um}$.

\* \* \* \* \*